(12) United States Patent
Girod

(10) Patent No.: US 6,677,987 B1
(45) Date of Patent: Jan. 13, 2004

(54) WIRELESS USER-INTERFACE ARRANGEMENT AND METHOD

(75) Inventor: Bernd Girod, Spardorf (DE)

(73) Assignee: 8×8, Inc., Santa Clara, CA (US)

( * ) Notice: Subject to any disclaimer, the term of this patent is extended or adjusted under 35 U.S.C. 154(b) by 961 days.

(21) Appl. No.: 08/984,602

(22) Filed: Dec. 3, 1997

(51) Int. Cl.[7] .............................................. H04N 5/225
(52) U.S. Cl. ...................................................... 348/171
(58) Field of Search ................................ 348/2, 141, 3, 348/142, 5, 15, 169–173, 13, 136, 135, 137, 116; 345/158, 157, 172, 156, 169; 364/188; 341/22; 382/151, 103; H04N 5/225

(56) References Cited

U.S. PATENT DOCUMENTS

| | | | |
|---|---|---|---|
| 4,578,674 A | | 3/1986 | Baker et al. |
| 5,365,266 A | * | 11/1994 | Carpenter ..................... 348/61 |
| 5,379,351 A | | 1/1995 | Fandrianto et al. |
| 5,448,261 A | | 9/1995 | Koike et al. |
| 5,459,489 A | | 10/1995 | Redford |
| 5,554,980 A | | 9/1996 | Hashimoto et al. |
| 5,594,469 A | | 1/1997 | Freeman et al. |
| 5,594,813 A | | 1/1997 | Fandrianto et al. |
| 5,617,312 A | | 4/1997 | Iura et al. |
| 5,729,220 A | * | 3/1998 | Russell ......................... 341/22 |
| 5,793,630 A | * | 8/1998 | Theimer et al. ........ 364/140.01 |
| 5,818,425 A | * | 10/1998 | Waqnt et al. ................. 345/158 |
| 5,831,664 A | * | 11/1998 | Wharton et al. ............... 348/13 |
| 5,854,624 A | * | 12/1998 | Grant .......................... 345/169 |
| 5,883,616 A | * | 3/1999 | Koizumi et al. ............. 345/156 |
| 5,943,042 A | * | 8/1999 | Siio ............................ 345/172 |
| 5,977,951 A | * | 11/1999 | Danili et al. ................ 345/156 |

* cited by examiner

Primary Examiner—Young Lee
Assistant Examiner—Tung Vo

(57) ABSTRACT

A wireless user-interface method and arrangement having a light source and a circuit arrangement that detects the presence and position of the light source. A light source emits modulated light having a first modulation frequency that is captured by a camera circuit arrangement. A circuit arrangement uses relative pixel luminances and differences in pixel luminances between frames to detect the presence of modulated light from the light source. The position of the light source is tracked from frame to frame and the position information is output for use by application software or circuitry to direct movement of a pointer in a computer display, for example. Modulated light having a second modulation frequency from the light source is detected by the circuit arrangement and interpreted as selection of a control function, which is provided as output to application software or circuitry. The application uses the position of the light source along with control signals to identify an operation to perform.

17 Claims, 6 Drawing Sheets

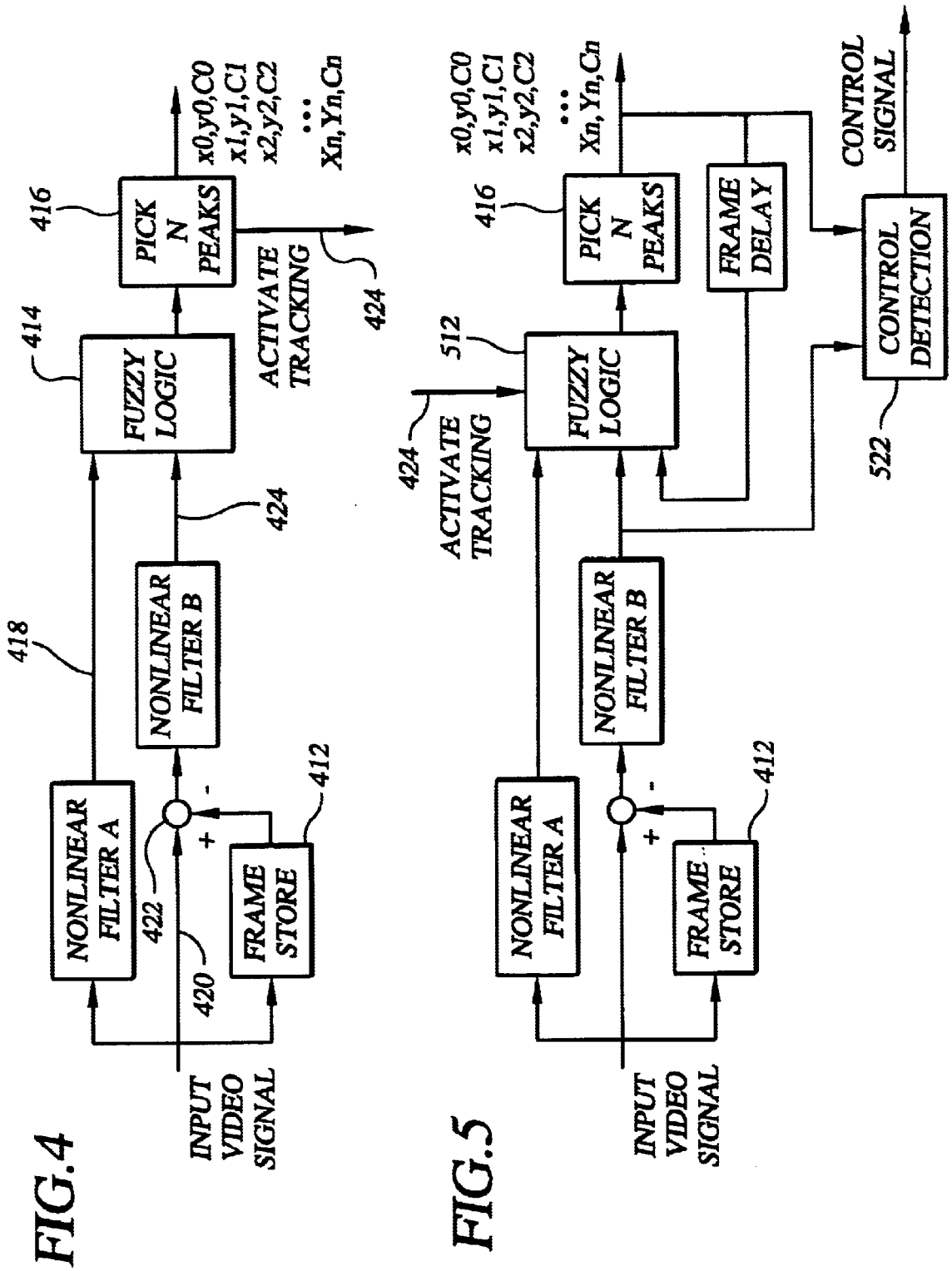

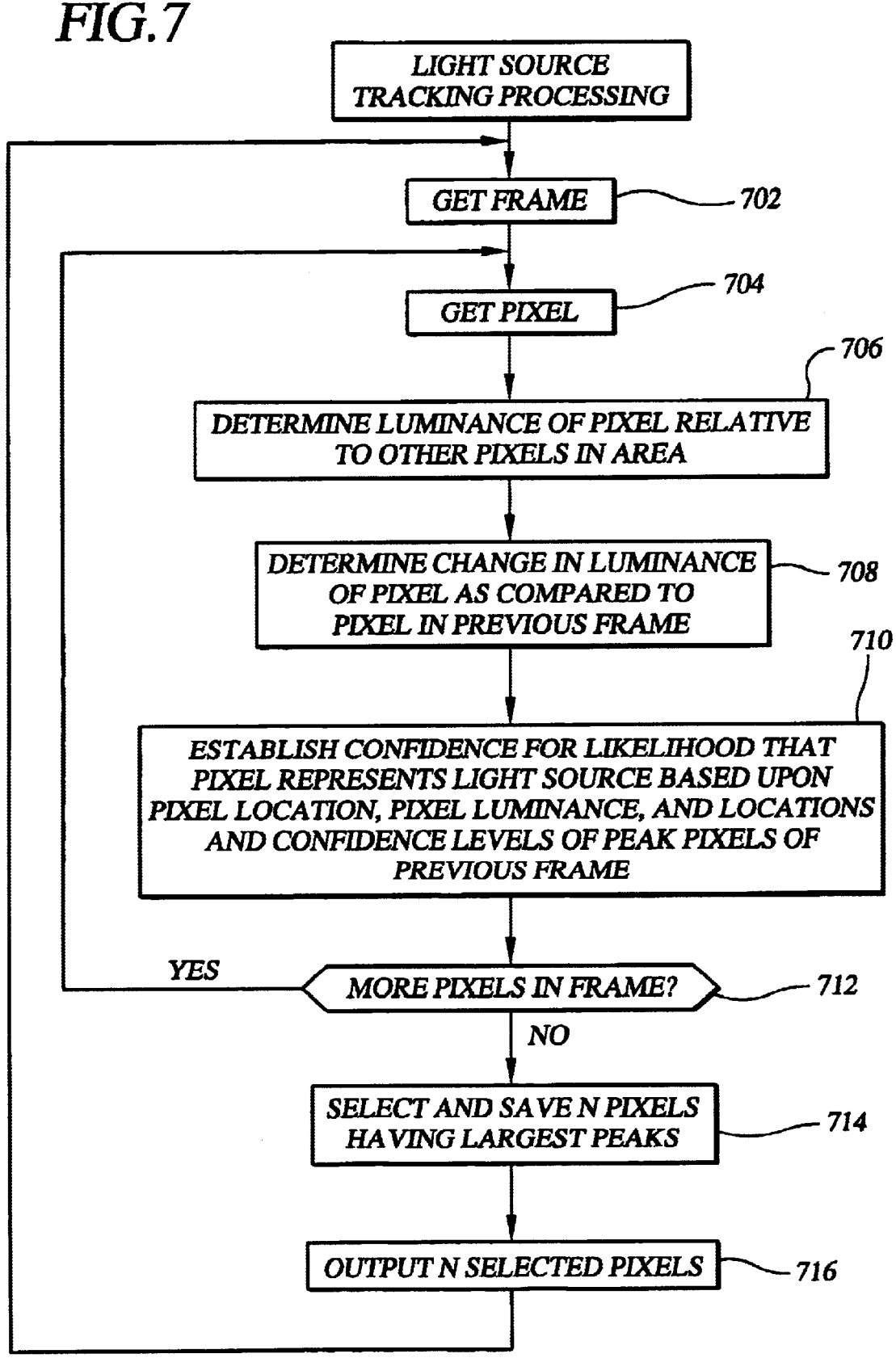

WIRELESS USER-INTERFACE ARRANGEMENT AND METHOD

FIELD OF THE INVENTION

The present invention generally relates to user interface systems, and more particularly to a user interface system that generates an image and position of a pointer in response to light from a positionable light source.

BACKGROUND OF THE INVENTION

Video communication systems have become increasingly popular. Video conferencing, for example, is becoming more common in both business and residential applications. Video conferencing permits audio as well as visual live communication between two remotely located terminals communicating over a single channel.

The apparent convergence of video and computing communication media is illustrated by the VC55 Modular Videophone with Web Browser videophone from 8×8, Inc. As described in the attached appendix, the VC55 includes both video conferencing and web browser capabilities in a single set-top box.

A system having the aforementioned combination of features challenges user-interface designers. The VC55 uses the keypad of a conventional touchtone telephone for a user control interface. While access to certain menu-driven functions is reasonably convenient using a keypad, Web browser control via a keypad is less convenient given the point-and-click nature of the browser user interface. Whereas a mouse may be suitable for PC-based video conferencing applications, the cabled nature of a mouse may be an impediment to convenient operation in applications that are not PC-based. Other approaches to wireless user-interfaces involve recognition of an object, such as a hand or a pen, within an image and tracking the motion of the object. Such approaches can be expensive in terms of sophisticated hardware and software.

SUMMARY OF THE INVENTION

The present invention is directed to user interface methods and arrangements for use in controlling computer based applications. In a first aspect of the invention, a method is provided for tracking within frames of digital video data movement of a light source that emits modulated light having a modulation frequency, wherein the modulation frequency of the light is different from a frequency of the frames of digital video data. The method comprises the steps of: determining presence of the light as a function of relative luminances of portions of a frame of digital video data and difference luminances between the portions of the frame and corresponding portions of a previous frame; storing coordinates and associated peak codes for selected portions of the frame, the peak codes indicative of relative luminances and difference luminances of the selected portions, and the selected portions having the greatest relative luminances and difference luminances; determining a position of the light within a frame as a function of the relative luminances, the difference luminances, and coordinates and associated peak codes of the selected portions of the frame relative to coordinates and associated peak codes of selected portions of the previous frame.

In another aspect of the invention, there is an apparatus for tracking within frames of digital video data movement of a modulated light source that emits light having a modulation frequency, wherein the modulation frequency of the light is different from a frequency of the frames of digital video data. The apparatus comprises: means for determining presence of the light as a function of relative luminances of portions of a frame of digital video data and difference luminances between the portions of the frame and corresponding portions of a previous frame; means for storing coordinates and associated peak codes for selected portions of the frame, the peak codes indicative of relative luminances and difference luminances of the selected portions, and the selected portions having the greatest relative luminances and difference luminances; means for determining a position of the light within a frame as a function of the relative luminances, the difference luminances, and coordinates and associated peak codes of the selected portions of the frame relative to coordinates and associated peak codes of selected portions of the previous frame.

A user interface circuit arrangement is another aspect of the invention. The circuit arrangement comprises: a camera configured and arranged to provide digital video images; a first detection circuit coupled to the camera and configured and arranged to detect a presence of modulated light having a first modulation frequency represented in the digital video images and generating a first signal in response to the presence of the modulated light; a tracking circuit coupled to the detection circuit and to the camera and configured and arranged to detect movement of the modulated light represented in the digital video images in response to the first signal from the detection circuit; and a second detection circuit coupled to the first detection circuit and configured and arranged to detect modulated light having a second modulation frequency represented in the digital video images and generating a second signal in response to the presence of the modulated light having the second modulation frequency and the first signal.

The above Summary of the Invention is not intended to describe each disclosed embodiment of the present invention. This is the purpose of the figures and of the Detailed Description that follows.

BRIEF DESCRIPTION OF THE DRAWINGS

Other aspects and advantages of the present invention will become apparent upon reading the following detailed description and upon reference to the drawings in which:

FIG. 4 is a block diagram of an example circuit that is arranged to locate light from a positionable light source in a digital video image;

FIG. 5 is a block diagram of an example embodiment of a circuit that is arranged to track the position of the light from a light source;

FIG. 7 is a flowchart of a method for tracking the position of a light source according to one embodiment of the invention.

Figure 1:
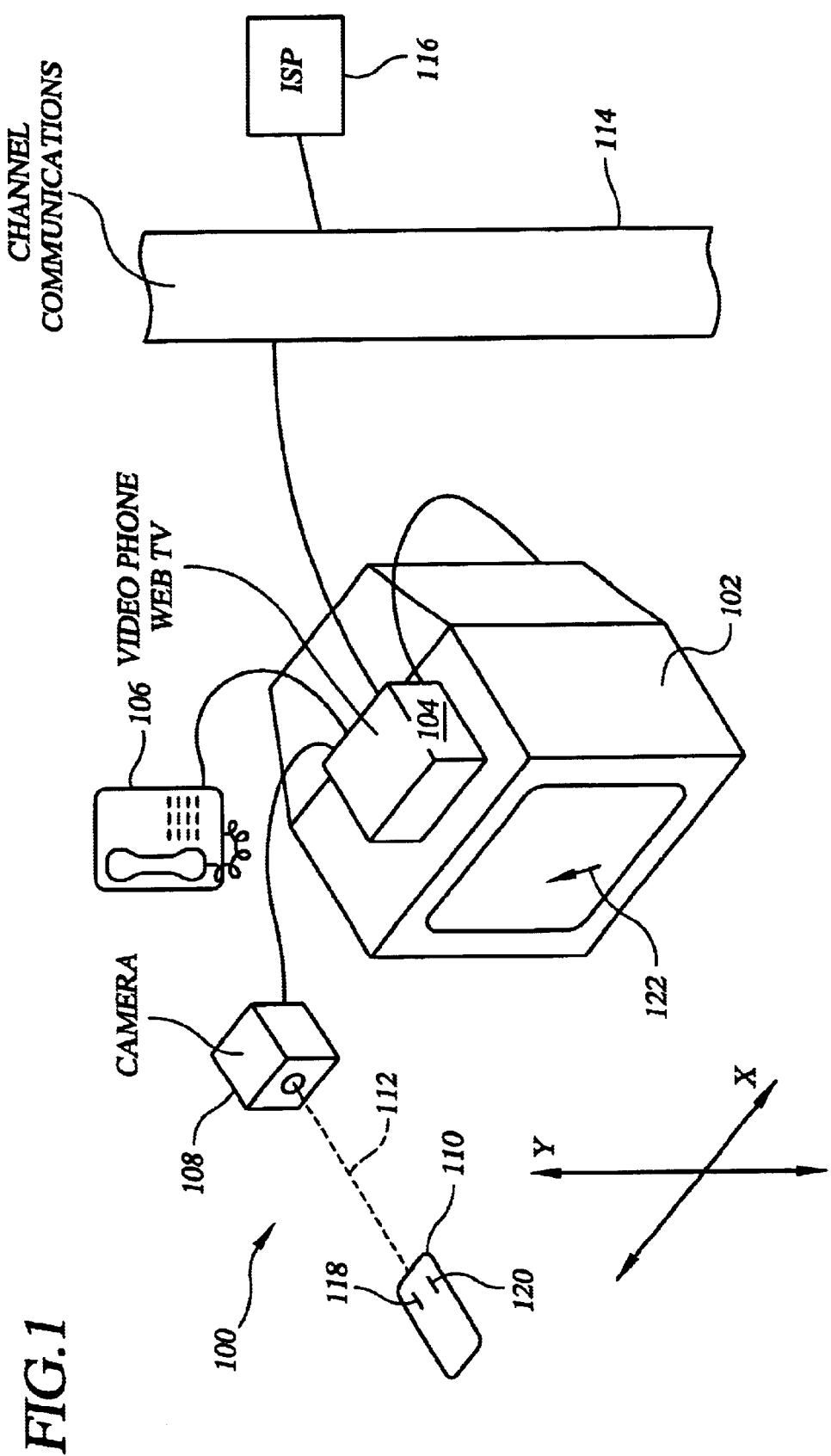
FIG. 1 is a pictorial diagram of an example system according to the present invention.

While the invention is amenable to various modifications and alternative forms, specifics thereof are shown by way of example in the drawings and the written description. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENT

The present invention is believed to be applicable to a variety of systems and arrangements that utilize point-and-click control of computer programs. The invention has been found to be particularly advantageous in application environments in which pointer movement is accomplished with a positionable light source that emits a light in combination with a digital camera circuit for detecting the light. An appreciation of various aspects of the invention is best gained through a discussion of various application examples operating in such environments.

FIG. 1 is a diagram of an example system according to the present invention. System 100 includes television 102, a set-top box 104 for providing video conferencing and Web TV functions, conventional telephone 106 coupled to set-top box 104, camera 108 coupled to set-top box 104, and positionable light source 110 for emitting light, as depicted by dashed line 112. Set-top box 104 is also coupled to communication channel 114, and coupled to communication channel 114 is an Internet Service Provider 116. User interaction with an application embodied in set-top box 104, such as a Web TV function, is accomplished with positionable light source 110, in combination with camera 108 and signal processing that takes place in set-top box 104.

Light source 110 includes buttons 118 and 120, wherein pressing button 118 causes light source 110 to emit light modulated at a first modulation frequency, a few Hertz, for example; and pressing button 120 in combination with button 118 causes light source 110 to continue emitting light, but modulated at a second modulation frequency. Note that in an alternate embodiment, pressing button 120 in combination with button 118 causes light source 110 to emit unmodulated light. Button 118 may be used, for example, to direct movement of pointer 122 as displayed on television 102. When button 118 is pressed and light source 110 is moved either about the X axis or Y axis, the movement of light source 110 is captured by camera 108, detected by set-top box 104, and the image displayed on television 102 is updated accordingly. When button 118 is not pressed, movement of light source 110 does not cause a corresponding movement of pointer 122. When button 120 is pressed in combination with button 118, light source 110 emits modulated light at the second modulation frequency, and circuitry within set-top box 104 detects the light and generates appropriate control signals. For example, pressing button 120 may cause control signals to be generated such that the web browser application in set-top box 104 seeks access to a different world-wide-web site.

It may be desirable for light source 120 to have characteristics that make it easy to track and locate the position of light source 120 as represented by the video signals. Example features include making the light source bright; using a light source having a characteristic color that does not appear frequently in natural scenes; and temporarily modulating the light source. If an infrared light source is used, a greater brightness is conceivable without being objectionable to a human user as compared to a light source emitting visible light. CCD cameras are usually sensitive to infrared light, such that the infrared light source shows up in the video signal, as does visible light, but is not visible to a human user. The brightness of the light may be enhanced by including a lens on the front portion of light source 110.

Using a characteristic spatial pattern (shape) for the light is also possible. However, it may be difficult to detect because of the varying distance and relative orientation between camera 108 and light source 110. The pattern may appear in various magnifications, rotations, and with various foreshortening, thus imposing a large computational burden for processing digital video images.

Note that the characteristic color and modulation may be used in combination. By using two light emitting diodes, a modulation switching from one characteristic color to another can be realized.

Communications channel 114 provides a communications interface between set-top box 104 and ISP 116, for example. Example embodiments of communication channel 114 include a public switched telephone network (PSTN), an internet, or an intranet, as well as any one of a number of other communication channel types, both direct and bussed. Internet service provider 116 is shown to illustrate support for the set-top box 104 functionality of a Web TV where communications channel 114 is a PSTN.

An example set-top box 104 is a Via TV Modular Videophone with Web browser from 8×8, Inc., as modified to include the capability to display pointer 122 as directed by light source 110.

Figure 2:
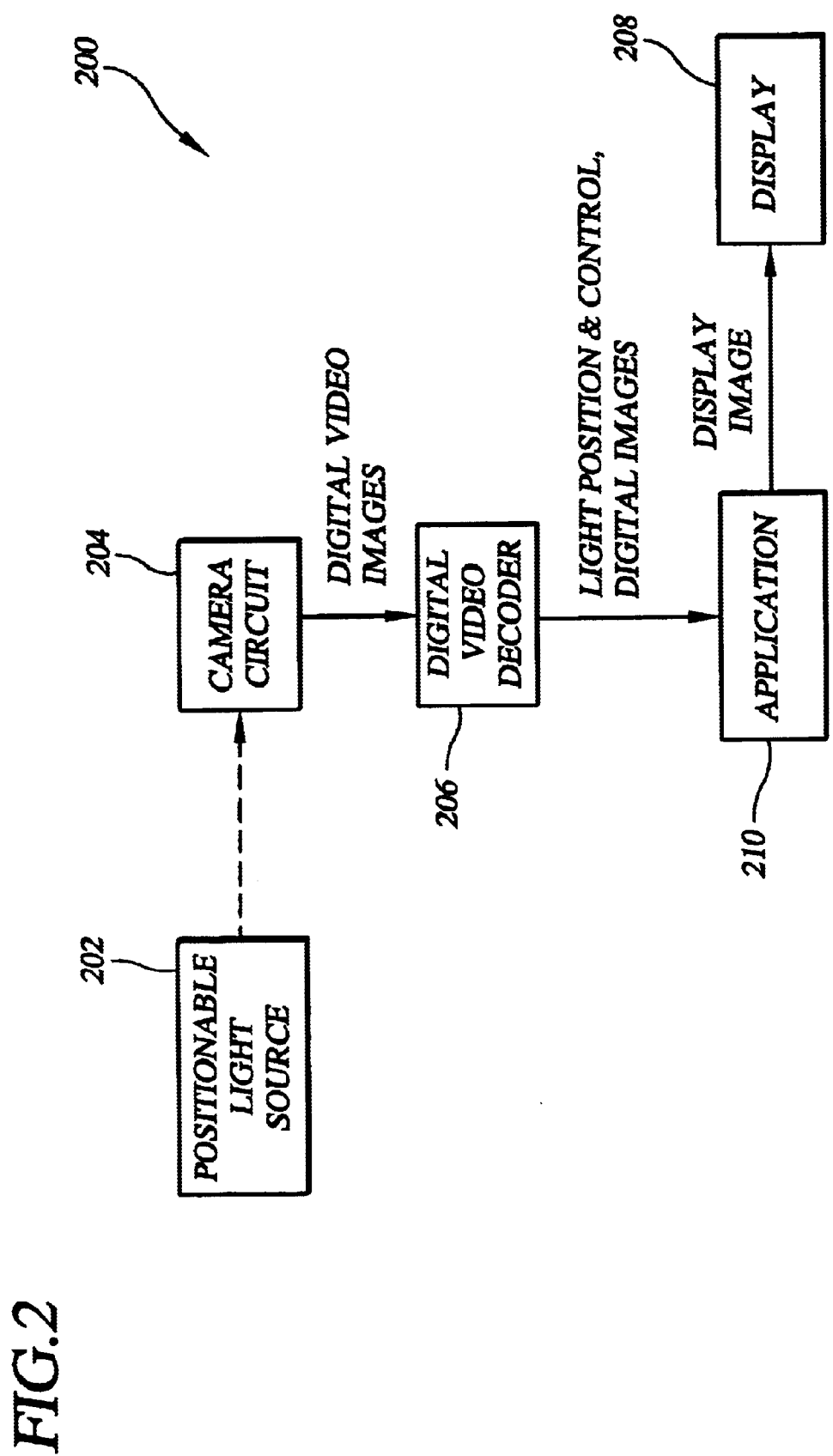
FIG. 2 is a functional block diagram of an example remote control system according to the present invention.

FIG. 2 is a functional block diagram of an example remote control system according to the present invention. Positionable light source 202 emits light which is captured by camera circuit arrangement 204. Camera 204 captures the light from light source 202, as well as light from a surrounding scene, and outputs digital video images to digital video decoder 206. Digital video decoder 206 is responsive to the light from light source 202, and the positions thereof within the digital video images, and outputs light source position and control signals, along with the digital images, to application 210. Application 210 is responsive to the position of the light and control signals from digital video decoder 206. The actions taken by application 210 may vary according to the nature of the application. For example, application 210 may update display 208 with a pointer shown in a new position in response to the position signals and perform a web browser function according to the control signals.

Light source 202 may take various forms. For example, light source 202 may be a light pen held relatively close to camera 204. Light source 202 may, alternatively, be an infrared light transmitter, such as a universal control used for home entertainment equipment. Camera circuit arrangement 204 is a camera that captures a scene and converts the scene to a digital video image. Alternatively, camera 204 may include a conventional video camera along with circuitry for converting output from the video camera to digital video images.

Digital video decoder 206 may be implemented in hardware, software, or various combinations thereof, depending upon the performance requirements for system 200. In an example embodiment, digital video decoder can be implemented using processing arrangements as disclosed in U.S. patent application Ser. Nos. 08/692,993 (U.S. Pat. No. 5,901,248) and 08/658,917, respectively entitled and relating to issued patents also entitled "Programmable Architecture and Methods or Motion Estimation" (U.S. Pat. No. 5,594,813) and "Video Compression and Decompression Processing and Processors" (U.S. Pat. No. 5,379,351).

These applications and issued patents are incorporated herein by reference.

Digital video decoder 206 compares successive frames of digital video images for the purpose of detecting movement of light source 202 as represented in the digital video images. In an example embodiment, light source 202 modulates the light at a rate that is different from the rate at which frames of digital video images are provided to digital video decoder 206 by camera 204. Such modulation of the light eliminates the necessity for sophisticated scene analysis as may be required where there is interference caused by light emitted from other light sources.

A first example application 210 is that for providing web browser functionality. In another application, the invention may be used to remotely control various electronic devices, wherein both a local site and a remote site have video conferencing capabilities. In such an application, both sites have a set-top box 104 and camera 108, wherein, for example, a remote set-top box also includes an infrared light transmitter. The local set-top box also includes circuitry for displaying an image of a remote scene as captured by a remote camera and overlaying a pointer on the scene based on light detected by a local camera. The local set-top box would also include circuitry for transmitting control signals to the remote set-top box in response to pressing a control button at the local light source in combination with the relative position of a pointer in the remote scene as displayed on the local display. In response to the control signals, the remote set-top box activates its infrared light transmitter, and various devices at the remote location may be activated by the infrared signals.

Figure 3:
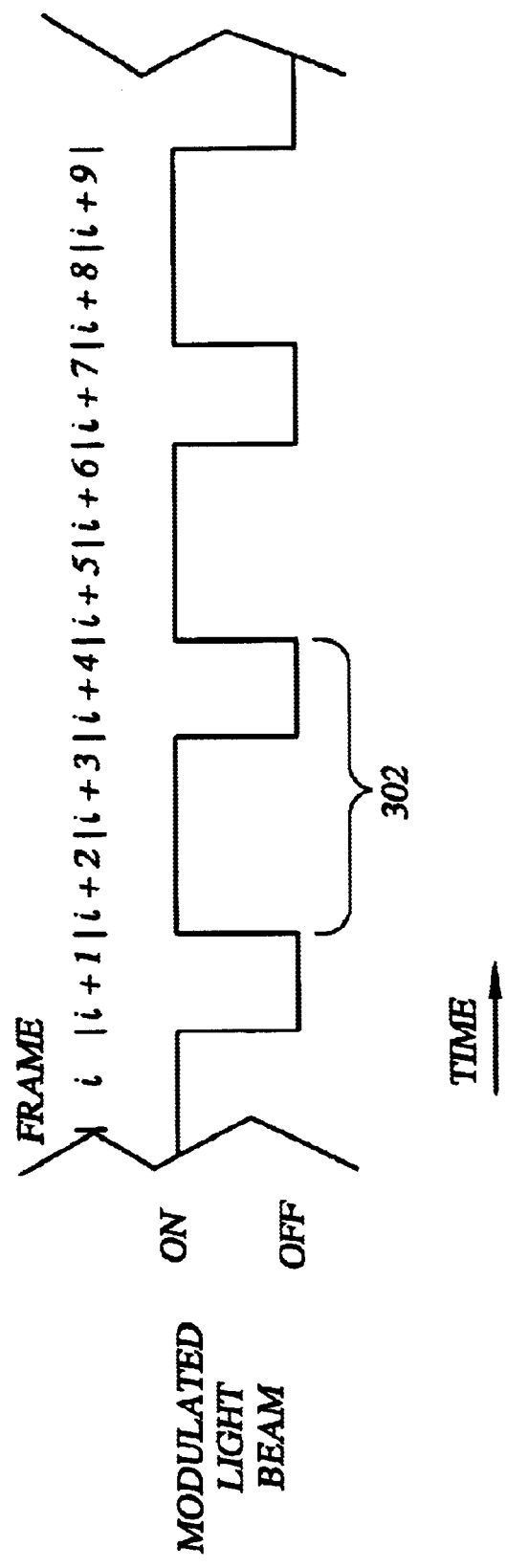
FIG. 3 is a timing diagram illustrating an example relationship between a modulated light and the frequency with which digital video images are provided by a camera circuit arrangement.

FIG. 3 is a timing diagram illustrating an example relationship between modulated light from a light source and the frequency with which digital video images are provided by camera 204. The light is modulated between an off-state and an on-state as shown by the diagram. The example frequency of the modulation of the light is one third the rate at which frames of digital video images are presented. That is, for each cycle of the modulated light, three frames of digital video images are presented. During cycle 302, for example, digital image frames i+2, i+3, and i+4, are presented. In frames i+2 and i+3, digital video decoder 206 detects that light from positionable light source 202 is on, and in frame i+4, digital video decoder 206 detects that the light is off.

Those skilled in the art will recognize that there are various modulation frequencies for a light source that would function in accordance with the present invention. A modulation frequency of a light that is different from the rate at which digital video images are provided will function in accordance with the present invention. A pseudo-random modulation frequency may also be suitable.

The modulation of the light from the positionable light source 202 helps digital video decoder 206 to discern between light from positionable light source 202 and light from other sources within the surrounding scene. For example, in comparing frame i+4 to frame i+3, digital video decoder 206 detects that the light has changed from an on-state to an off-state, and in comparing frame i+5 to frame i+4, digital video decoder 206 detects that the light has changed from an off-state to an on-state. Thus, the change in state of the light from one frame to the next is used to identify a particular light source represented in the digital video images. Note that the invention is not limited to modulating the light between an on-state and an off-state. Relative intensities of light are contemplated.

FIG. 4 is a block diagram of an example circuit that is configured and arranged to locate light from a positionable light source in a digital video image. The example circuit of FIG. 4 locates the light by using the relative luminances of pixels and the difference between pixel luminances within successive frames. The circuit includes non-linear filters A and B, frame store 412, fuzzy logic circuit 414, and selection circuit 416. Non-linear filter A computes a median luminance within an area of a frame of a digital video image and compares the median to the luminance of a current pixel being processed. If the luminance of the current pixel exceeds the median luminance by a predetermined threshold, non-linear filter A produces a positive output signal on line 418, otherwise the output is 0, for example. The amplitude of the output from non-linear filter A represents the quantity by which the luminance of the current pixel exceeds the median luminance.

Non-linear filter B detects the modulation of the light from light source 202, for example, by analyzing the difference in pixel luminance from one frame to a successive frame. A previous frame is stored in frame store 412, and a current frame is input via line 420. Non-linear filter B first calculates the absolute value of the frame difference. Then, the frame difference is compared to the local median of the frame difference signal. If the frame difference exceeds the median by a predetermined threshold, a first signal is produced on output line 424, otherwise, a second output signal is provided on line 424.

Output signals from filters A and B are input to fuzzy logic circuit 414. Fuzzy logic circuit 414 implements the following rules, where A is the output from filter A, and B represents the output from filter B, and C is the output from fuzzy logic circuit 414.

1) If both A and B are small, C is small;
2) If A is large, and B is small, C is small;
3) If A is small, and B is large, C is small;
4) If both A and B are large, C is large.

Selection circuit 416 analyzes the data produced by fuzzy logic circuit 414 by selecting N pixels having the largest peaks in the image. If the largest peak exceeds a predetermined threshold, the light source has been found, and the tracking mode is activated. As indicated by signal line 424. The remaining pixels are also saved and provided as input to the circuit for tracking the light, together with confidence values C0, C1, C2, . . . that are derived from the height and width of the peaks.

FIG. 5 is a block diagram of an example embodiment of a circuit that is configured and arranged to track the position of the light from a light source. Non-linear filter A, non-linear filter B, frame store 412, and selection circuit 416 function in a manner which is similar to the corresponding circuits of FIG. 4. However, fuzzy logic circuit 512 operates differently from fuzzy logic circuit 414 of FIG. 4. Fuzzy logic circuit 512 is activated by a signal provided on signal line 424 and uses the peak locations (X0, Y0) (X1, Y1), (X2, Y2) . . . of the previous frame, as well as the associated confidence values C0, C1, C2 . . . associated with these peaks. Fuzzy logic circuit 512 operates according to the following rules:

1) If A is small, C is small;
2) If near a peak of the previous frame
   If A is large, C is large, regardless of B
   else C is small
3) If not near a peak of the previous frame
   If A is large, and B is large, C is large;
   else C is small.

In this manner, preference is given to peaks that are near peaks in the previous frame, regardless of the light source location indicated by the frame difference signal. On the other hand, the circuit of FIG. 5 can correct an erroneous location to a correct location, if both the individual frame signal and the frame difference signal indicate the presence of the modulated light source elsewhere in the frame. If none of the peaks is great enough, the circuit detects that the light source has been turned off.

Control detection circuit 522 is responsive to the peak signals output from selection circuit 416 and to output from filter B. Control detection circuit 522 detects when a control function is selected at light source 110. An example function at light source 110 is that which is analogous to clicking a mouse button. The function selection is detected by monitoring the output of nonlinear filter B at the location of the selected, greatest peak over several frames. If the output of filter B is 0 for at least two frames, the light source has switched to a steady on state or, alternatively, the modulation of the light has changed to a second modulation frequency. Note that for more reliable detection, more frames may be monitored for a steady state output from filter B. Note that light source 110 must be held steady for successful selection of a control function.

Figure 6:
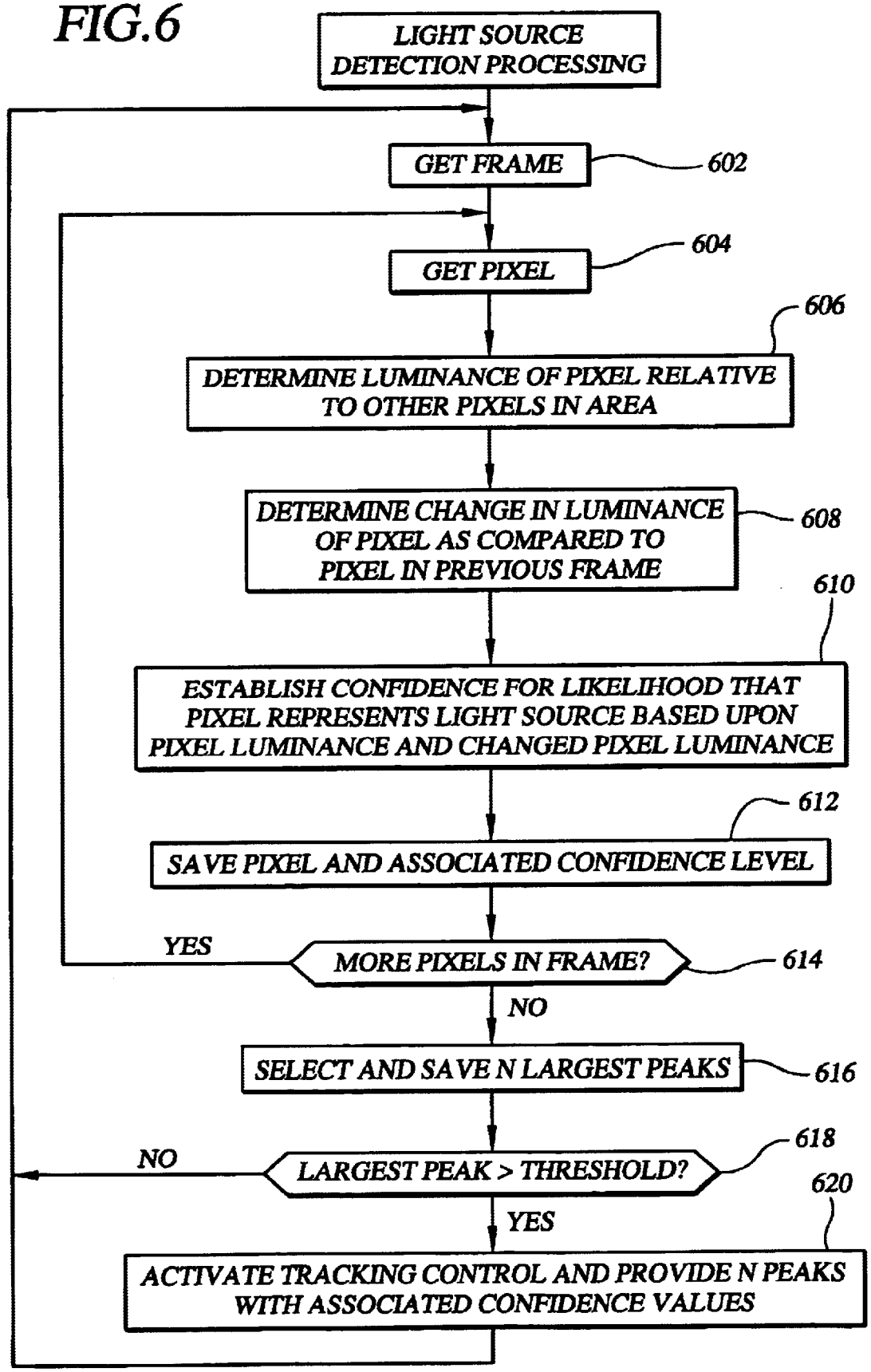
FIG. 6 is a flowchart of a method for detecting the presence of a light source according to one embodiment of the invention.

FIG. 6 is a flowchart of a method for detecting the presence of a light source according to embodiment of the invention. Pixels within a frame of digital video data are processed as shown by processing blocks 602 and 604. At processing block 606, the relative luminance of the current pixel in process is determined relative to other pixels in a predetermined area. Processing block 606 corresponds to non-linear filter A of FIG. 4. The change in luminance of the current pixel, as compared to the corresponding pixel in a previous frame, is determined at processing block 608. The processing of block 608 corresponds to non-linear filter B of FIG. 4. Continuing now with processing block 610, which corresponds to fuzzy logic circuit 414, based upon the pixel luminance and change in pixel luminance, a confidence factor is established for the likelihood that the pixel represents the light source. The current pixel position and its associated confidence level are stored at processing block 612.

If there are more pixels to process in the frame, processing block 614 directs control to processing block 604, otherwise, control is directed to processing block 616. When all the pixels in a frame have been processed, processing block 616 selects and saves a predetermined number of pixels having the largest peak values. If the largest of the saved predetermined number of largest peaks is greater than a predetermined threshold, processing block 618 directs control to processing block 620. At processing block 620, the processing for tracking the position of the light source is activated, and the predetermined number of peaks along with the associated confidence values are provided as input. Control is then returned to processing block 602 for processing subsequent frames.

FIG. 7 is a flowchart of a method for tracking the position of a light source according to one embodiment of the invention. Frames and pixels are processed successively as indicated by processing block 702 and 704. At processing block 706, the luminance of the current pixel is determined relative to other pixels in a predetermined area of the frame. Then, the change in luminance of the current pixel, as compared to the corresponding pixel in a previous frame, is determined at processing block 708. Once the relative luminance and change in luminance of the current pixel have been determined, processing block 710 establishes a confidence value for the likelihood that the pixel represents the light source, based upon the pixel location, the pixel luminance, and locations and confidence levels of peak pixels of the previous frame. The processing of processing block 710 corresponds to fuzzy logic circuit 512 of FIG. 5.

If there are more pixels to process in the current frame, processing block 712 directs control to processing block 704, otherwise, control is directed to processing block 714. A predetermined number of pixels having the largest peaks are selected at processing block 714, which corresponds to circuit 416 of FIG. 5. The selected pixels are then provided as output as shown by processing block 716, and control is returned to processing block 702 to begin processing a successive frame.

The various embodiments described above are provided by way of illustration only and should not be construed to limit the invention. Those skilled in the art will readily recognize various modifications and changes that may be made to the present invention without strictly following the example embodiments and applications illustrated and described herein, and without a parting from the true spirit and scope of the present invention which is set forth in the following claims.

I claim:

1. A method for tracking within frames of digital video data movement of a light source that emits light modulated different from a frequency of the frames of digital video data, comprising the steps of:

determining presence of the light as a function of relative luminances of portions of a frame of digital video data and difference luminances between the portions of the frame and corresponding portions of a previous frame;

storing coordinates and associated codes for selected portions of the frame, the codes indicative of relative luminances and difference luminances of the selected portions, and the selected portions having the greatest relative luminances and difference luminances; and determining a position of the light within a frame as a function of the relative luminances, the difference luminances, and coordinates and associated codes of the selected portions of the frame relative to coordinates and associated codes of selected portions of the previous frame.

2. An apparatus for tracking within frames of digital video data movement of a light source that emits light modulated different from a frequency of the frames of digital video data, comprising:

means for determining presence of the light as a function of relative luminances of portions of a frame of digital video data and difference luminances between the portions of the frame and corresponding portions of a previous frame;

means for storing coordinates and associated peak codes for selected portions of the frame, the peak codes indicative of relative luminances and difference luminances of the selected portions, and the selected portions having the greatest relative luminances and difference luminances; and means for determining a position of the light within a frame as a function of the relative luminances, the difference luminances, and coordinates and associated peak codes of the selected portions of the frame relative to coordinates and associated peak codes of selected portions of the previous frame.

3. A user interface circuit arrangement comprising:

a camera configured and arranged to provide digital video images;

a first detection circuit coupled to the camera and configured and arranged to detect a presence of modulated light having a first modulation frequency represented in the digital video images and generate a first signal in response to the presence of the modulated light;

a tracking circuit coupled to the detection circuit and to the camera and configured and arranged to detect movement of the modulated light represented in the digital video images in response to the first signal from the detection circuit; and a second detection circuit coupled to the first detection circuit and configured and arranged to detect modulated light having a second modulation frequency represented in the digital video images and generate a second signal in response to the presence of the modulated light having the second modulation frequency and the first signal.

4. The method of claim 1, wherein determining the presence of light includes receiving the modulated light along with video images.

5. The method of claim 1, wherein determining the presence of light includes receiving the modulated light along with video images and further including, after receiving the modulated light, decoding the light using a digital video decoder.

6. The method of claim 5, wherein the digital video decoder uses a video processor programmed to compare successive frames of video images and discern between modulated light and light from other sources.

7. The method of claim 1, further including comparing successive frames of video images and discerning between modulated light and light from other sources.

8. The method of claim 7, wherein the modulated light is modulated at a pseudo-random frequency.

9. The method of claim 7, wherein the modulated light is modulated at a constant frequency.

10. The arrangement of claim 3, wherein at least one of the first detection circuit, the tracking circuit and the second detection circuit includes a digital video decoder.

11. The arrangement of claim 10, wherein the digital video decoder includes a computer programmed to compare successive frames of video images.

12. The arrangement of claim 11, wherein the modulated light is modulated at a pseudo-random frequency.

13. The arrangement of claim 11, wherein the modulated light is modulated at a constant frequency.

14. The arrangement of claim 11, wherein the computer is further programmed to discern between modulated light and light from other sources.

15. The arrangement of claim 10, wherein the digital video decoder is adapted to discern between modulated light and light from other sources.

16. A method for tracking within frames of digital video data movement of a light source that emits light modulated different from a frequency of the frames of digital video data, comprising the steps of:

determining presence of the modulated light as a function of relative luminances of portions of a frame of digital video data and difference luminances between the portions of the frame and corresponding portions of a previous frame; and determining a position of the light within a frame as a function of the relative luminances and the difference luminances relative to coordinates of selected portions of the previous frame.

17. An apparatus for tracking within frames of digital video data movement of a light source that emits light modulated different from a frequency of the frames of digital video data, comprising:

means for determining presence of the modulated light as a function of relative luminances of portions of a frame of digital video data and difference luminances between the portions of the frame and corresponding portions of a previous frame; and means for determining a position of the light within a frame as a function of the relative luminances and the difference luminances relative to coordinates of selected portions of the previous frame.

* * * * *